(No Model.)
H. LÖHNERT.
NUT LOCK.
No. 505,947. Patented Oct. 3, 1893.
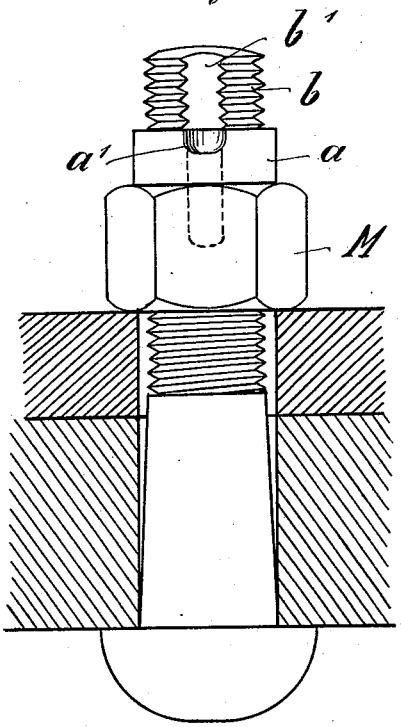
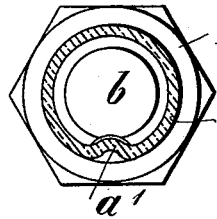
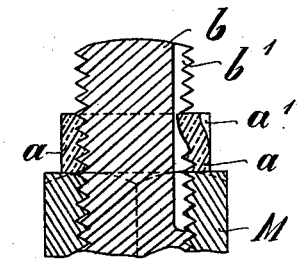
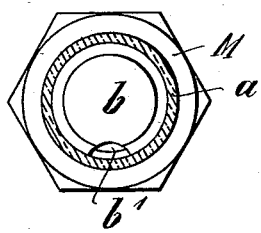
Witnesses:
M. A. Cunningham.
W. Lansing Murray.
Inventor,
Hirman Löhnert
by Bowen & Behrens
attys.

UNITED STATES PATENT OFFICE.

HERMAN LÖHNERT, OF BROMBERG, GERMANY, ASSIGNOR TO ELSBETH LÖHNERT, OF SAME PLACE.

NUT-LOCK.

SPECIFICATION forming part of Letters Patent No. 505,947, dated October 3, 1893.

Application filed December 24, 1892. Serial No. 456,217. (No model.) Patented in Germany November 21, 1891, No. 63,753; in Belgium March 19, 1892, No. 98,877, and in England June 18, 1892, No. 11,444.

*To all whom it may concern:*

Be it known that I, HERMAN LÖHNERT, a subject of the King of Prussia, residing at Bromberg, a city of the Empire of Germany, have invented certain new and useful Improvements in Devices for Locking Nuts on Bolts, of which the following is a specification.

I have obtained on this invention the following foreign Letters Patent: Germany, No. 63,753, dated November 21, 1891; Belgium, No. 98,877, dated March 19, 1892, and England, No. 11,444, dated June 18, 1892.

This locknut device consists of a ring which acts as a checknut and is screwed against the nut proper the checknut being made of soft tough material and a portion of its wall or circumference being adapted to be forced by means of a suitable tool into a recess provided in the bolt so that the ring is thus fixed in position and the nut proper also prevented from coming undone or loose. The fastening or locknut device can only be loosened by turning the checknut with great force, whereby the bulged part of the checknut is shorn off by the hard screw thread of the bolt or forced out of the recess in the bolt. The checknut may however be used again another part of same being made to enter the recess.

Figure 1 of the accompanying drawings is a side view of a bolt fitted with such a locknut device. Fig. 2 is a vertical section; Fig. 3 a horizontal section showing part of the checknut bulged in and Fig. 4 a horizontal section showing the checknut intact or without a bulged-in part.

The checknut or ring $a$ the outside of which may be hexagon, square, round, or any other suitable shape is made of soft tough material by preference of copper. By means of a spanner or tongs it is screwed firmly against the nut proper M so that it acts as a check nut thereto. To prevent the checknut $a$ from coming undone the portion $a'$ shown here to be located near the upper edge of the same is forced into a longitudinal groove $b'$ provided in the bolt as shown in Figs. 2 and 3. Instead of the groove $b'$ any other recess may be used for a portion of the comparatively soft checknut $a'$ to enter. It will readily be seen that it will be easier to force into groove $b'$ a part along the upper edge of check nut $a'$ as mentioned above, than to force in a part near its lower edge, as in the latter case the resistance, owing to the binding action of nut $a$ upon nut M, would be so great as to make the operation much more difficult, and unless special tools were used, made for that particular purpose, it might even be impossible to sufficiently force the lower part of nut $a$ into groove $b'$ to firmly secure said lock-nut in position and to thereby firmly fix the position of nut M. If the nut M is to be further tightened up the checknut $a$ is also tightened up by the emyloyment of some force in turning it whereby the bulged in part $a'$ is shorn off by the harder screw threads of the bolt $b$ or forced out again. The checknut will then have to be forced into the groove $b'$ in another part. The undoing of the device, the tightening up of the checknut $a$ and the securing of the same again can thus be effected without removing the checknut $a$ from the bolt $b$.

After the upper edge of check nut $a$ has been indented or forced in in a number of places such upper edge will become useless as far as repeating this operation is concerned, but the lower edge can then be utilized in the same manner by simply temporarily detaching said nut $a$ from bolt $b$ and then screwing it on again bottom side up, and of course after the new upper edge has likewise become useless, a new lock-nut $a$ may then be placed above nut M. I am aware that it has been proposed heretofore to use hard metal nuts having soft metal collars rigidly attached thereto on bolts having longitudinal slots or grooves and to force portions of such soft metal collars into said grooves for the purpose of locking the nuts on the bolts. My arrangement under which independent soft metal nuts are used instead of such collars, is far preferable and much more economical for the reason stated above, that such a nut can be used in new positions at least twice as often as such a collar and further that the nut M being made of hard metal and consequently practically indestructible may be used in successive combinations with any number of such nuts, or independent of the same, while a nut having permanently attached to it a soft metal collar as mentioned above becomes practically, at least temporarily, useless after the usefulness of its collar has been exhausted.

I claim as new and desire to secure by Letters Patent—

A nut and bolt lock, comprising a grooved bolt b, a nut M, and an independent soft metal nut threaded on the bolt and adapted to be bent or swaged into the groove thereof, substantially as set forth.

In testimony whereof I have signed my name to this specification in the presence of two subscribing witnesses.

HERMAN LÖHNERT.

Witnesses:
 W. H. EDWARDS,
 W. HAUPT.